United States Patent
Vajo et al.

(10) Patent No.: US 9,777,968 B1
(45) Date of Patent: Oct. 3, 2017

(54) METAL HYDRIDE-BASED THERMAL ENERGY STORAGE SYSTEMS

(71) Applicant: HRL Laboratories, LLC, Malibu, CA (US)

(72) Inventors: John J. Vajo, West Hills, CA (US); Zhigang Fang, Salt Lake City, UT (US)

(73) Assignee: HRL Laboratories, LLC, Malibu, CA (US)

( * ) Notice: Subject to any disclaimer, the term of this patent is extended or adjusted under 35 U.S.C. 154(b) by 349 days.

(21) Appl. No.: 14/519,208

(22) Filed: Oct. 21, 2014

Related U.S. Application Data (60) Provisional application No. 61/893,346, filed on Oct. 21, 2013.

(51) Int. Cl.
*F28D 20/00* (2006.01)

(52) U.S. Cl.
CPC .... *F28D 20/003* (2013.01); *F28D 2020/0082* (2013.01)

(58) Field of Classification Search
CPC ........ B01D 2259/402; B01D 2259/655; B01D 2256/16; Y02E 60/362; Y02E 60/324; Y02E 60/321; Y10S 420/49; Y10S 420/90; F17C 11/005; C01B 6/24; C01B 3/508; C01B 3/506; C01B 3/54; F28D 20/003; F28D 2020/0082

See application file for complete search history.

(56) References Cited

U.S. PATENT DOCUMENTS

| | | | | |
|---|---|---|---|---|
| 4,360,505 A | * | 11/1982 | Sheridan, III | B01D 53/0473 420/900 |
| 4,409,799 A | * | 10/1983 | Nishizaki | F25B 17/12 165/104.12 |
| 4,599,867 A | * | 7/1986 | Retallick | C01B 3/0005 123/533 |
| 6,722,154 B1 | * | 4/2004 | Tan | B01D 53/265 62/106 |

(Continued)

OTHER PUBLICATIONS

Ioannidou et al., Structure, microstructure and hydrogen storage properties of melt-spun V55Ti21Cr17Fe7 and V55Ti21Mn17Fe7, 2013.

(Continued)

*Primary Examiner* — Tho V Duong
(74) *Attorney, Agent, or Firm* — O'Connor & Company

(57) ABSTRACT

The invention provides a thermal energy storage system comprising a metal-containing first material with a thermal energy storage density of about 1300 kJ/kg to about 2200 kJ/kg based on hydrogenation; a metal-containing second material with a thermal energy storage density of about 200 kJ/kg to about 1000 kJ/kg based on hydrogenation; and a hydrogen conduit for reversibly transporting hydrogen between the first material and the second material. At a temperature of 20° C. and in 1 hour, at least 90% of the metal is converted to the hydride. At a temperature of 0° C. and in 1 hour, at least 90% of the metal hydride is converted to the metal and hydrogen. The disclosed metal hydride materials have a combination of thermodynamic energy storage densities and kinetic power capabilities that previously have not been demonstrated. This performance enables practical use of thermal energy storage systems for electric vehicle heating and cooling.

24 Claims, 3 Drawing Sheets

(56) References Cited

U.S. PATENT DOCUMENTS

| | | | | |
|---|---|---|---|---|
| 7,213,409 | B1* | 5/2007 | Nuckols | ............... F25B 17/12 |
| | | | | 62/408 |
| 8,790,616 | B2 | 7/2014 | Pulskamp et al. | |
| 2005/0253019 | A1* | 11/2005 | Hoehne | ............... B64D 11/02 |
| | | | | 244/129.1 |
| 2005/0274492 | A1* | 12/2005 | Golben | ................. B60H 1/32 |
| | | | | 165/104.12 |
| 2014/0238634 | A1* | 8/2014 | Ronnebro | ............ F28D 20/003 |
| | | | | 165/10 |

OTHER PUBLICATIONS

Muthukumar, et al., "Metal hydride based heating and cooling systems: A review", International Journal of Hydrogen Energy (2010) 35: 3817-3831.

Sandrock et al., pp. 197-258 in Topics in Applied Physics: Hydrogen in Intermetallic Compounds II, 1992.

Felderhoff et al., "High Temperature Metal Hydrides as Heat Storage Materials for Solar and Related Applications", Int. J. Mol. Sci. 2009, 10, 325-344; doi:10.3390/ijms10010325.

Zhou et al., "Effect of Ti Intermetallic Catalysts on Hydrogen Storage Properties of Magnesium Hydride," J. Phys. Chem. C 2013, 117, 12973-12980.

Kuriiwa et al., "Effects of V content on hydrogen storage properties of VeTieCr alloys with high desorption pressure", International Journal of Hydrogen Energy 35 (2010) 9082-9087.

Lu et al., "Hydrogen Storage Properties of Nanosized MgH2-0.1TiH2 Prepared by Ultrahigh-Energy-High-Pressure Milling," J. Am. Chem. Soc. 2009, 131, 15843-15852.

\* cited by examiner

METAL HYDRIDE-BASED THERMAL ENERGY STORAGE SYSTEMS

PRIORITY DATA

This patent application is a non-provisional application with priority to U.S. Provisional Patent App. No. 61/893,346, filed Oct. 21, 2013, which is hereby incorporated by reference herein.

STATEMENT REGARDING FEDERALLY SPONSORED RESEARCH OR DEVELOPMENT

This invention was made with Government support under Contract No. DE-AR0000173 with ARPA-E, United States Department of Energy. The Government has certain rights in this invention.

FIELD OF THE INVENTION

The present invention generally relates to thermal energy storage systems.

BACKGROUND OF THE INVENTION

Thermal energy storage is a technology that stocks thermal energy by providing thermal or chemical energy to a storage medium so that the stored energy can be used at a later time for heating and cooling applications and power generation. There are three kinds of thermal energy storage systems, namely: sensible heat storage that is based on storing thermal energy by heating or cooling a liquid or solid storage medium (e.g. water, sand, molten salts, rocks); 2) latent heat storage using phase change materials; and 3) thermo-chemical storage using chemical reactions to store and release thermal energy. Thermo-chemical reactions can be used to accumulate and discharge heat and cold on demand in a variety of applications using different chemical reactants. At present, thermal energy storage systems based on sensible heat are commercially available while thermo-chemical reaction and phase change material storage systems are mostly still under development and demonstration.

Energy systems based on hydrogen are interesting candidates to replace fossil fuels for future energy global needs and assist in mitigating the associated environmental problems. The absorption of hydrogen in solid materials and particularly in metal hydrides is a promising technique, due to the high volumetric energy density and the required relatively low pressures.

Currently, electrical energy-based heating and cooling systems are used in electric vehicles because electric vehicles generate insufficient waste heat for heating. In these systems, stored chemical energy is first converted to electrical energy by batteries or fuel cells and subsequently converted into heat. Electrical-to-thermal energy conversion processes such as resistive heating or compressor-based refrigeration are inefficient. In contrast, converting stored chemical energy directly into heat using a thermal energy storage system can be much more efficient. However, thus far, materials for thermal energy storage systems have not had the proper combination of thermodynamic and kinetic properties needed to simultaneous fulfill the energy storage density and power requirements.

The prior art contains numerous examples of metal hydride materials used in a wide variety of thermal energy storage systems. For example, see Sandrock et al., pp. 197-258 in *Topics in Applied Physics: Hydrogen in Intermetallic Compounds II*, 1992; and Muthukumar and Groll, "Metal hydride based heating and cooling systems: A review, *International Journal of Hydrogen Energy* 35 3817-3831 (2010). These include systems that utilize $MgH_2$ as part of the hydride material. However, the $MgH_2$ in these systems is used at high temperature, such as 300° C. For example, see Bogdanovic et al., "Active $MgH_2$—Mg systems for reversible chemical energy storage," *Angewandte Chemie* 29 223-234, 1990. The $MgH_2$ used in these systems is not suitable for use in vehicle heating and cooling systems because these systems must operate from near room temperature, around 20° C. These systems use alloys that have hydrogen gravimetric capacities of <2.0 wt %, which yield energy densities too low for vehicle applications.

In view of the aforementioned needs in the art, improved thermal energy storage systems employing metal hydrides for reversible hydrogenation and dehydrogenation are desired, preferably addressing both thermodynamics and kinetics requirements of the materials.

SUMMARY OF THE INVENTION

In some variations, the invention provides a thermal energy storage system comprising:

a first container or region and a second container or region, wherein the first container or region is spatially separated from the second container or region;

in the first container or region, a metal-containing first material having a first-material metallic state and a first-material metal hydride state, wherein the first material has a first-material thermal energy storage density of about 1300 kJ/kg to about 2200 kJ/kg based on hydrogenation of the first-material metallic state to the first-material metal hydride state;

in the second container or region, a metal-containing second material having a second-material metallic state and a second-material metal hydride state, wherein the second material has a second-material thermal energy storage density of about 200 kJ/kg to about 1000 kJ/kg based on hydrogenation of the second-material metallic state to the second-material metal hydride state, and wherein the second material is different than the first material; and a hydrogen conduit connecting the first container or region with the second container or region, wherein the hydrogen conduit is configured for reversibly transporting hydrogen between the first container or region and the second container or region, wherein the first material is kinetically characterized in that at a temperature of 20° C. and in 1 hour, in the presence of hydrogen, at least 90% of the first-material metallic state is converted to the first-material metal hydride state, and wherein the second material is kinetically characterized in that at a temperature of 0° C. and in 1 hour, at least 90% of the second-material metal hydride state is converted to the second-material metallic state and hydrogen.

In some embodiments, the first-material thermal energy storage density is about 1600 kJ/kg to about 2200 kJ/kg. In these or other embodiments, the second-material thermal energy storage density is about 200 kJ/kg to about 450 kJ/kg.

In some embodiments, the first material is kinetically characterized in that at a temperature of 20° C. and in 1 hour, in the presence of hydrogen, at least 95% or at least 99% of the first-material metallic state is converted to the first-material metal hydride state. In these or other embodiments, the second material is kinetically characterized in that at a temperature of 0° C. and in 1 hour, at least 95% or at least 99% of the second-material metal hydride state is converted to the second-material metallic state and hydrogen.

In certain thermal energy storage systems, the first material comprises MgH$_2$ and a catalyst with catalytic activity for hydrogenating the first-material metallic state to the first-material metal hydride state. For example, the catalyst may be a Ti-containing catalyst selected from the group consisting of Ti, TiH$_2$, TiAl, Ti$_3$Al, TiNi, TiFe, TiNb, TiMn$_2$, TiVMn, and combinations thereof. In certain embodiments, the catalyst is selected from the group consisting of TiH$_2$, TiAl, TiMn$_2$, and combinations thereof. The catalyst may be present in the first material from about 1% to about 20%, or about 5% to about 10% of the first material on an atom basis.

In certain thermal energy storage systems, the second material comprises an intermetallic compound or intermetallic solid solution. For example, the second material may include V$_x$Ti$_y$Cr$_z$, wherein x+y+z=1, 0.5<x<1.0, 0<y<0.5, and 0<z<0.5. The second-material metal hydride state may comprise V$_x$Ti$_y$Cr$_z$H$_h$ wherein h is from about 0.1 to about 2.0.

Some variations provide a thermal energy storage system comprising:

a first container or region and a second container or region, wherein the first container or region is spatially separated from the second container or region;

in the first container or region, a metal-containing first material having a first-material metallic state and a first-material metal hydride state, wherein the first material has a first-material thermal energy storage density of about 1300 kJ/kg to about 2200 kJ/kg based on hydrogenation of the first-material metallic state to the first-material metal hydride state, wherein the first material comprises MgH$_2$ and a catalyst with catalytic activity for hydrogenating the first-material metallic state to the first-material metal hydride state;

in the second container or region, a metal-containing second material having a second-material metallic state and a second-material metal hydride state, wherein the second material has a second-material thermal energy storage density of about 200 kJ/kg to about 1000 kJ/kg based on hydrogenation of the second-material metallic state to the second-material metal hydride state, and wherein the second material is different than the first material;

a hydrogen conduit connecting the first container or region with the second container or region, wherein the hydrogen conduit is configured for reversibly transporting hydrogen between the first container or region and the second container or region; and a first heat-transfer medium in communication with a first heat-transfer surface of the first container or region, and a second heat-transfer medium in communication with a second heat-transfer surface of the second container or region, wherein the first material is kinetically characterized in that at a temperature of 20° C. and in 1 hour, in the presence of hydrogen, at least 90% Mg is converted to MgH$_2$, and wherein the second material is kinetically characterized in that at a temperature of 0° C. and in 1 hour, at least 90% of the second-material metal hydride state is converted to the second-material metallic state and hydrogen.

In some embodiments, the first-material thermal energy storage density is about 1600 kJ/kg to about 2200 kJ/kg and/or the second-material thermal energy storage density is about 200 kJ/kg to about 450 kJ/kg.

In some embodiments, the first material is kinetically characterized in that at a temperature of 20° C. and in 1 hour, in the presence of hydrogen, at least 95% of the Mg is converted to MgH$_2$. In these or other embodiments, the second material is kinetically characterized in that at a temperature of 0° C. and in 1 hour, at least 95% of the second-material metal hydride state is converted to the second-material metallic state and hydrogen.

The second material may include an intermetallic compound or intermetallic solid solution, such as (but not limited to) V$_x$Ti$_y$Cr$_z$, wherein x+y+z=1, 0.5<x<1.0, 0<y<0.5, and 0<z<0.5. The second-material metal hydride state may include V$_x$Ti$_y$Cr$_z$H$_h$ wherein h is from about 0.1 to about 2.0.

DETAILED DESCRIPTION OF EMBODIMENTS OF THE INVENTION

The system, structures, compositions, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Variations of this invention provide a metal hydride-based thermal energy storage system which may be used for electric vehicle heating and cooling, for example. Advanced metal hydride material formulations have been discovered that, when combined in a suitable system configured to take advantage of material thermodynamics and kinetics, simultaneously fulfill energy storage density and power requirements.

Preferred metal hydride materials have a combination of thermodynamic energy storage densities and kinetic power capabilities that previously have not been demonstrated. This performance enables practical use of thermal energy storage systems for electric vehicle heating and cooling (air conditioning).

Specifically, magnesium hydride ($MgH_2$), which is known to have a very high energy-storage density, may be employed in a new formulation that significantly improves its kinetics and hence power capabilities. Similarly, V—Ti—Cr alloys, which have excellent kinetic properties, may be employed with optimized compositions that improve their thermodynamic energy storage densities. Pure $MgH_2$, without additives, cannot be used for applications that require operation from room temperature because of kinetic limitations.

One formulation containing $MgH_2$ with kinetic properties suitable for use from room temperature can be found in Lu et al., "Hydrogen storage properties of nanosized $MgH_2$-$0.1TiH_2$ prepared by ultrahigh-energy-high-pressure milling," *Journal of the American Chemical Society*, 131 15843-15852 (2009), which is hereby incorporated by reference herein. Because this formulation was developed for hydrogen storage applications and because $MgH_2$ was for so long considered only for high-temperature thermal energy storage applications, this new formulation has not been previously utilized for room-temperature systems. Some variations of the invention are premised on the realization that nanosized $MgH_2$-$0.1TiH_2$ prepared by ultrahigh-energy-high-pressure milling, for example, may be employed at temperatures at or near room temperature.

One formulation containing V—Ti—Cr alloy compositions with significantly higher hydrogen storage capacity compared to previous V, Ti, or Cr materials, is described in Kuriiwa et al., "Effects of V content on hydrogen storage properties of V—Ti—Cr alloys with high desorption pressure," *International Journal of Hydrogen Energy* 35 9082-9087 (2010), which is hereby incorporated by reference herein.

In some embodiments, the system contains at least a first hydride with a thermal energy storage density of at least 1300 kJ/kg (equivalently 0.36 kWh/kg or 260 kJ/mol-$H_2$·wt %-$H_2$) up to 2200 kJ/kg (equivalently 0.62 kWh/kg or 450 kJ/mol-$H_2$·wt %-$H_2$). This first metal hydride can be substantially hydrogenated beginning from ~20° C. within 1 hour. The theoretical energy density of magnesium hydride ($MgH_2$) is 2700 kJ/kg (equivalently 0.75 kWh/kg, 540 kJ/mol-$H_2$·wt %-$H_2$). Thus, theoretically, $MgH_2$ satisfies the energy density requirement.

Moreover, a recently described formulation comprising $MgH_2$ described in Lu et al., "Hydrogen storage properties of nanosized $MgH_2$-$0.1TiH_2$ prepared by ultrahigh-energy-high-pressure milling," *Journal of the American Chemical Society*, 131 15843-15852 (2009), can also be nearly fully hydrogenated beginning from room temperature in less than 1 hour. This performance satisfies the kinetics requirement. Due to the inclusion of the $TiH_2$ in the $MgH_2$-$0.1TiH_2$ formulation, the energy density is lowered to ~1950 kJ/kg. However, this still satisfies the energy density requirement. An alternative similarly prepared formulation contains $MgH_2$ with 5 at % $TiMn_2$ alloy. The energy density for this formulation is 2200 kJ/kg (equivalently 0.62 kWh/kg or 450 kJ/mol-$H_2$·wt %-$H_2$. See Zhou et al., "Effect of Ti Intermetallic Catalysts on Hydrogen Storage Properties of Magnesium Hydride," *Journal of Physical Chemistry C*, 117 12973-12980 (2013), which is hereby incorporated by reference herein. Other possibilities for the first metal hydride include hydrides comprising LiH, NaH, Mg/Na alloy hydrides, or combinations thereof.

The system also contains at least a second metal hydride with a thermal energy storage density of at least 200 kJ/kg (equivalently 0.05 kWh/kg or 40 kJ/mol-$H_2$·wt %-$H_2$) up to 450 kJ/kg (equivalently 0.12 kWh/kg or 90 kJ/mol-$H_2$·wt %-$H_2$). This metal hydride can be substantially dehydrogenated at 0° C. within 1 hour. Recently described metal hydrides with the general chemical composition given by $V_xTi_yCr_z$, where x+y+z=1 and 0.5<x<1.0, 0<y<0.5, and 0<z<0.5, have been shown to have gravimetric hydrogen storage capacities of >2.0 wt % (see Kuriiwa et al., "Effects of V content on hydrogen storage properties of V—Ti—Cr alloys with high desorption pressure," *International Journal of Hydrogen Energy* 35 9082-9087 (2010), which is hereby incorporated by reference herein).

Metal hydride materials are part of an overall thermal energy storage system, which as known in the art will also contain various conduits (e.g. pipes or tubes), valves, pumps, heat exchangers, computers or other programmable elements, temperature probes, and other instrumentation. Some embodiments can be understood with reference to FIG. 1, which is a simplified block-flow diagram of an exemplary thermal energy storage system 100.

Figure 1:
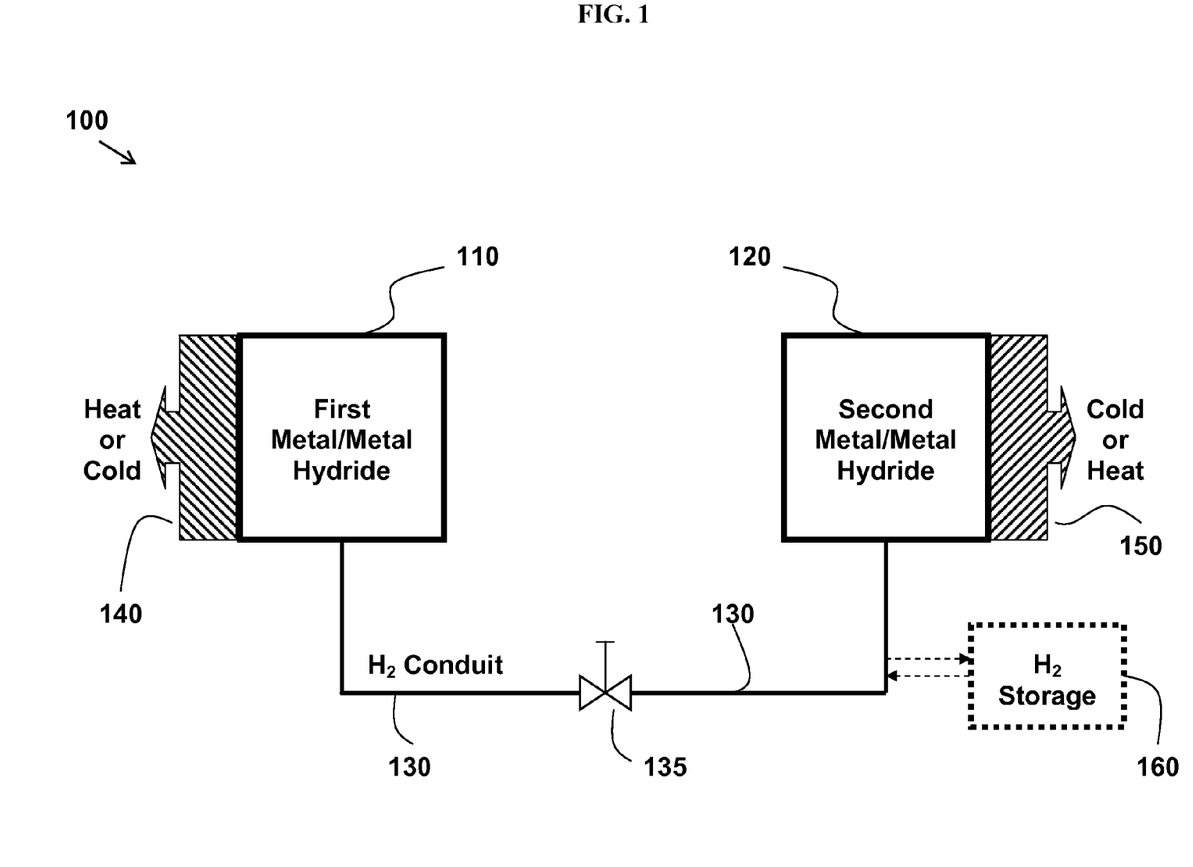
FIG. 1 is a simplified block-flow diagram of an exemplary thermal energy storage system, in some variations.

The system of FIG. 1 includes two regions 110, 120 containing two distinct metal hydrides, a hydrogen conduit 130 connecting the two regions 110, 120, and heat exchangers 140, 150 on the two sides, respectively. A "hydrogen conduit" 130 is a pipe, tube, or other means of transporting hydrogen gas reversibly from one metal hydride to the other metal hydride. Typically the hydrogen conduit 130 will include a valve 135 and/or other means to regulate gas flow rate and pressure. The heat exchangers 140, 150 are configured to transport heat or cold to a heat-transfer medium, such as air, water, or another fluid. During operation, one of the heat exchangers 140, 150 will provide heating while the other provides cooling. A hydrogen storage container 160 (with connections to/from the hydrogen conduit) is optional. Other elements (not shown) could include one or more pumps or compressors, one or more pressure regulators, temperature and pressure probes, and so on.

In some embodiments, the combination of region 110 and heat-exchanger 140 forms the "hot side" while the combination of region 120 and heat-exchanger 150 forms the "cold side." At the hot side, exothermic dehydrogenation produces heat that can be transferred to a heat-transfer fluid, such as air for generating hot air. At the cold side, endothermic hydrogenation consumes heat and can provide cooling, such as cooled air or chilled water. The hot and cold sides can then be switched and direction of hydrogen flow reversed, either during normal operation or during regeneration.

In some variations, the invention provides a thermal energy storage system comprising:

a first container or region and a second container or region, wherein the first container or region is spatially separated from the second container or region;

in the first container or region, a metal-containing first material having a first-material metallic state and a first-material metal hydride state, wherein the first material has a first-material thermal energy storage density of about 1300 kJ/kg to about 2200 kJ/kg based on hydrogenation of the first-material metallic state to the first-material metal hydride state;

in the second container or region, a metal-containing second material having a second-material metallic state and a second-material metal hydride state, wherein the second material has a second-material thermal energy storage density of about 200 kJ/kg to about 1000 kJ/kg based on hydrogenation of the second-material metallic state to the second-material metal hydride state, and wherein the second material is different than the first material; and a hydrogen conduit connecting the first container or region with the second container or region, wherein the hydrogen conduit is configured for reversibly transporting hydrogen between the first container or region and the second container or region, wherein the first material is kinetically characterized in that at a temperature of 20° C. and in 1 hour, in the presence of hydrogen, at least 90% of the first-material metallic state is converted to the first-material metal hydride state, and wherein the second material is kinetically characterized in that at a temperature of 0° C. and in 1 hour, at least 90% of the second-material metal hydride state is converted to the second-material metallic state and hydrogen.

The "container or region" may be a physical container such as a tank, vessel, box, compartment, or bag, for example. It is also possible to have two spatially separated regions or zones within a single container, provided there is sufficient heat and mass transfer within the single container. That is, the heat and mass transfer flow patterns should be designed to hydrogenate in one region and dehydrogenate in another region, and recover useful heat or cold with heat exchangers, while minimizing undesirable transport of $H_2$ or energy away from the particular region.

In some embodiments, the first-material thermal energy storage density is at least about 500, 600, 700, 800, 900, 1000, 1100, 1200, 1300, 1400, 1500, 1600, 1700, 1800, 1900, 2000, 2100, or 2200 kJ/kg. In certain embodiments, the first-material thermal energy storage density is about 1600 kJ/kg to about 2200 kJ/kg.

In some embodiments, the second-material thermal energy storage density is at least about 100, 200, 300, 400, 500, 600, 700, 800, 900, or 1000 kJ/kg. In certain embodiments, the second-material thermal energy storage density is about 200 kJ/kg to about 450 kJ/kg.

In some embodiments, the first material is kinetically characterized in that at a temperature of 20° C. and in 1 hour, in the presence of hydrogen, at least 95%, 96%, 97%, 98%, or 99% of the first-material metallic state is converted to the first-material metal hydride state. The hydrogen may be hydrogen obtained from dehydrogenation of the second material, and/or optionally another source of hydrogen (such as stored $H_2$).

In this disclosure, by "kinetically characterized" it is meant that the material exhibits the stated reaction rate (hydrogenation/dehydrogenation) in the absence of any mass-transfer limitations of reactants or products, as measured at the stated temperature (isothermally) and reaction time (at the reaction temperature). In reality, depending on the material particle size and system configuration (including $H_2$ inlet and outlet), there may be some amount of mass-transfer limitation. In this case, the observed rate of hydrogenation or dehydrogenation may be lower than the kinetic rate, i.e., the chemistry is mass-transfer controlled. When the system is kinetically controlled, the observed rate of hydrogenation or dehydrogenation will be governed by the chemical kinetics of the material, which is a physicochemical property of the selected metal or metal hydride composition on the molecular level.

"In the presence of hydrogen" is intended to mean that at least a stoichiometric molar amount of $H_2$ is present to react with the first metal, in its metallic state (e.g., Mg), to produce the metal hydride (e.g., $MgH_2$). In the case of $Mg/MgH_2$, the stoichiometric amount of hydrogen is one mole of $H_2$ per mole of Mg. If less $H_2$ is present or available, then the conversion from first-material metallic state to first-material metal hydride state will be less (once all $H_2$ is consumed). Nevertheless, the kinetic rate may still be high such that at a temperature of 20° C. and in 1 hour, at least 95% of the first-material metallic state is converted to the first-material metal hydride state in some portion of the metal hydride container. Or, at least 95% of the $H_2$ that is available, even if it is less than the stoichiometric amount, may combine with the metal (e.g., Mg being converted to $MgH_2$) at a temperature of 20° C. and in 1 hour.

In these or other embodiments, the second material is kinetically characterized in that at a temperature of 0° C. and in 1 hour, at least 95%, 96%, 97%, 98%, or 99% of the second-material metal hydride state is converted to the second-material metallic state and hydrogen. The hydrogen may be used for hydrogenation of the first material, or optionally stored or used for another purpose (in which case supplemental hydrogen will be necessary for hydrogenation of the first material).

Metal hydrides discharge (evolve) hydrogen when the material is heated and uptake (absorb) hydrogen when the material is cooled. Thus, metals that absorb hydrogen will release heat when hydrogen is filled under pressure. Hydrogen is released when the pressure is reduced and heat is supplied. For example, upon heating up of $MgH_2$ in a closed system the compound will dissociate giving Mg and $H_2$ and the hydrogen pressure above the remaining $MgH_2$ will increase exponentially following the van't Hoff law.

The pressure within the system, or within one of the containers or regions, may vary over time. Each metal hydride will have an equilibrium pressure-temperature relationship. In various embodiments, for example, the pressure may vary from about 0.01 atm to about 100 atm (such as in FIG. 2). Pressure may be adjusted in the hydrogen conduit or in a hydrogen storage unit, for example, to increase or decrease $H_2$ pressure. In some embodiments, a hydrogen storage unit 160 (FIG. 1) is used, along with a compressor and/or vacuum, to aid in regulating $H_2$ pressure.

In certain thermal energy storage systems, the first material comprises $MgH_2$ and a catalyst with catalytic activity for hydrogenating the first-material metallic state to the first-material metal hydride state. For example, the catalyst may be a Ti-containing catalyst selected from the group consisting of Ti, $TiH_2$, TiAl, $Ti_3Al$, TiNi, TiFe, TiNb, $TiMn_2$, TiVMn, and combinations thereof. In certain embodiments, the catalyst is selected from the group consisting of $TiH_2$, TiAl, $TiMn_2$, and combinations thereof. The catalyst may be present in the first material from about 1% to about 20%, such as about 2%, 5%, 10%, or 15% of the first material on an atom basis.

In certain thermal energy storage systems, the second material comprises an intermetallic compound or intermetallic solid solution. For example, the second material may include $V_xTi_yCr_z$, wherein x+y+z=1, 0.5<x<1.0, 0<y<0.5, and 0<z<0.5. The second-material metal hydride state may comprise $V_xTi_yCr_zH_h$ wherein h is from about 0.1 to about 2.0, such as about 0.5, 1.0, 1.5, or 2.0.

In some embodiments, the second material includes include hydrides of $LaNi_5$ and/or $TiMn_2$. The second material may be a combination of $V_xTi_yCr_z$, $LaNi_5$, and $TiMn_2$, in certain embodiments.

Some variations provide a thermal energy storage system comprising:

a first container or region and a second container or region, wherein the first container or region is spatially separated from the second container or region;

in the first container or region, a metal-containing first material having a first-material metallic state and a first-material metal hydride state, wherein the first material has a first-material thermal energy storage density of about 1300 kJ/kg to about 2200 kJ/kg based on hydrogenation of the first-material metallic state to the first-material metal hydride state, wherein the first material comprises $MgH_2$ and a catalyst with catalytic activity for hydrogenating the first-material metallic state to the first-material metal hydride state;

in the second container or region, a metal-containing second material having a second-material metallic state and a second-material metal hydride state, wherein the second material has a second-material thermal energy storage density of about 200 kJ/kg to about 1000 kJ/kg based on hydrogenation of the second-material metallic state to the second-material metal hydride state, and wherein the second material is different than the first material;

a hydrogen conduit connecting the first container or region with the second container or region, wherein the hydrogen conduit is configured for reversibly transporting hydrogen between the first container or region and the second container or region; and a first heat-transfer medium in communication with a first heat-transfer surface of the first container or region, and a second heat-transfer medium in communication with a second heat-transfer surface of the second container or region, wherein the first material is kinetically characterized in that at a temperature of 20° C. and in 1 hour, in the presence of hydrogen, at least 90% Mg is converted to $MgH_2$, and wherein the second material is kinetically characterized in that at a temperature of 0° C. and in 1 hour, at least 90% of the second-material metal hydride state is converted to the second-material metallic state and hydrogen.

In some embodiments, the first-material thermal energy storage density is about 1600 kJ/kg to about 2200 kJ/kg and/or the second-material thermal energy storage density is about 200 kJ/kg to about 450 kJ/kg.

In some embodiments, the first material is kinetically characterized in that at a temperature of 20° C. and in 1 hour, in the presence of hydrogen, at least 95% of the Mg is converted to $MgH_2$. In these or other embodiments, the second material is kinetically characterized in that at a temperature of 0° C. and in 1 hour, at least 95% of the second-material metal hydride state is converted to the second-material metallic state and hydrogen.

The second material may include an intermetallic compound or intermetallic solid solution, such as (but not limited to) $V_xTi_yCr_z$, wherein x+y+z=1, 0.5<x<1.0, 0<y<0.5, and 0<z<0.5. The second-material metal hydride state may include $V_xTi_yCr_zH_h$ wherein h is from about 0.1 to about 2.0.

In some embodiments, the second material includes include hydrides of $LaNi_5$ and/or $TiMn_2$.

In some variations, the invention provides a thermal energy storage system comprising:

a first container or region and a second container or region, wherein the first container or region is spatially separated from the second container or region;

in the first container or region, a metal-containing first material having a first-material metallic state and a first-material metal hydride state, wherein the first material has a first-material thermal energy storage density of about 1300 kJ/kg to about 2200 kJ/kg based on hydrogenation of the first-material metallic state to the first-material metal hydride state, and wherein the first material is kinetically characterized in that at a temperature of 20° C. and in 1 hour, in the presence of hydrogen, at least 90% of the first-material metallic state is converted to the first-material metal hydride state;

in the second container or region, a metal-containing second material having a second-material metallic state and a second-material metal hydride state, wherein the second material is different than the first material;

a hydrogen conduit connecting the first container or region with the second container or region, wherein the hydrogen conduit is optionally configured for reversibly transporting hydrogen between the first container or region and the second container or region; and an optional hydrogen storage container configured for introducing hydrogen to or receiving hydrogen from the hydrogen conduit, and/or configured for introducing hydrogen directly to or receiving hydrogen from the first container or region, the second container or region, or both containers/regions.

In some variations, the invention provides a thermal energy storage system comprising:

a first container or region and a second container or region, wherein the first container or region is spatially separated from the second container or region;

in the first container or region, a metal-containing first material having a first-material metallic state and a first-material metal hydride state;

in the second container or region, a metal-containing second material having a second-material metallic state and a second-material metal hydride state, wherein the second material is different than the first material, wherein the second material is kinetically characterized in that at a temperature of 0° C. and in 1 hour, at least 90% of the second-material metal hydride state is converted to the second-material metallic state and hydrogen;

a hydrogen conduit connecting the first container or region with the second container or region, wherein the hydrogen conduit is configured for reversibly transporting hydrogen between the first container or region and the second container or region; and an optional hydrogen storage container configured for introducing hydrogen to or receiving hydrogen from the hydrogen conduit, and/or configured for introducing hydrogen directly to or receiving hydrogen from the first container or region, the second container or region, or both containers/regions.

EXAMPLE

Figure 2:
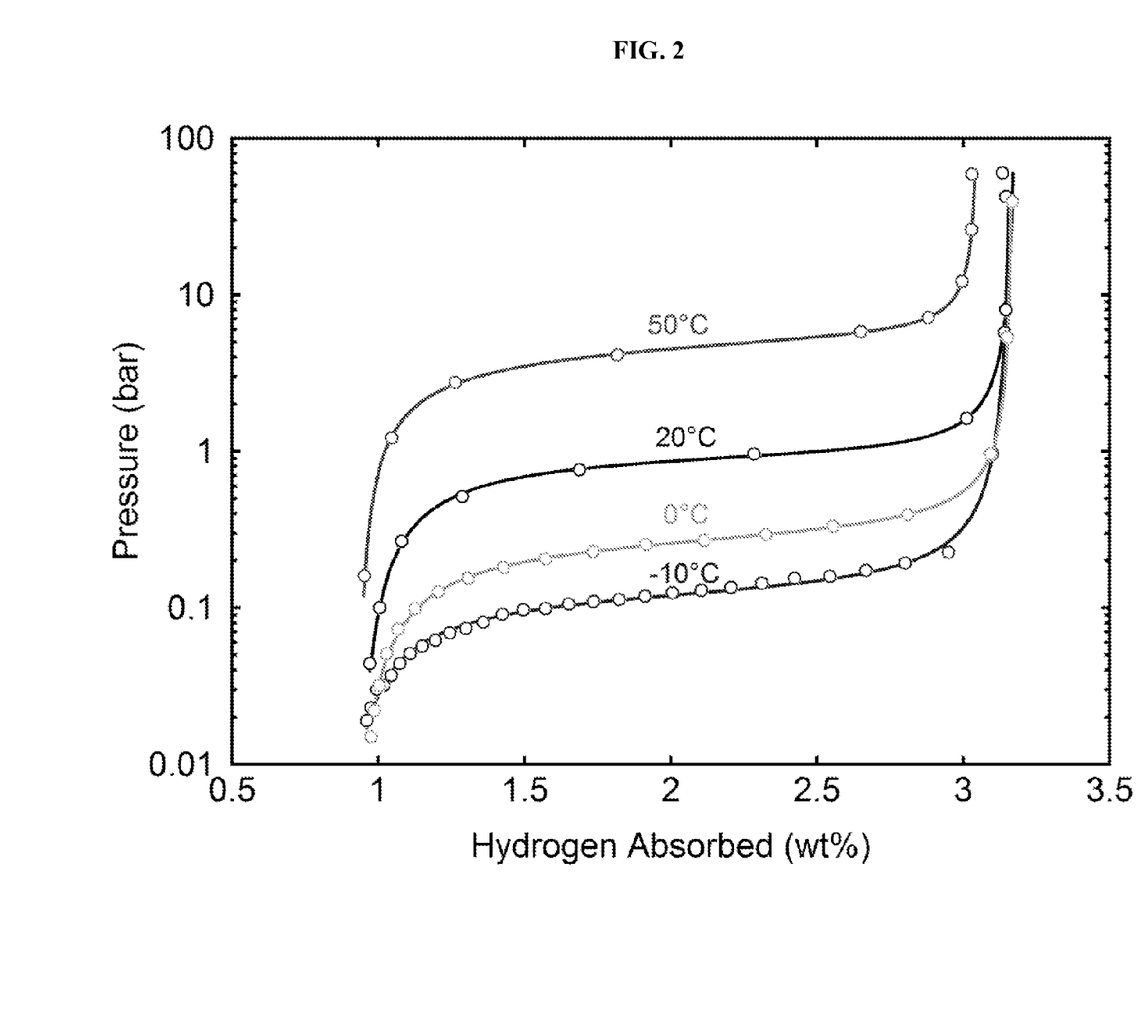
FIG. 2 is a plot of several hydrogen desorption isotherms of a metal alloy with composition V$_{0.80}$Ti$_{0.08}$Cr$_{0.12}$, in some embodiments (see Example).

FIG. 2 shows hydrogen desorption isotherms of an alloy custom-synthesized at Ames Laboratory with the particular composition of $V_{0.80}Ti_{0.08}Cr_{0.12}$ (alternatively written as 80V-8Ti-12Cr). From the variation of the plateau pressure with temperature from −10° C. to 50° C., the hydrogen desorption enthalpy is about 42 kJ/mol-$H_2$. Specifically, the slope of the dependence of ln P versus 1/T (van't Hoff plot not shown) at the midpoint of the plateau (at about 2 wt % hydrogen) gives a desorption enthalpy of about 42 kJ/mol-$H_2$. This enthalpy together with a usable hydrogen capacity of 2.2 wt %, gives an energy density of about 450 kJ/kg.

To demonstrate that a V—Ti—Cr alloy can also meet the requirement to substantially dehydrogenate within 1 hour at 0° C., a self-limiting dehydrogenation test is performed using a sample of 75V-5Ti-20Cr ($V_{0.75}Ti_{0.05}Cr_{0.2}$). After activating the sample through several complete hydrogenation/dehydrogenation cycles conducted at room temperature, the 75V-5Ti-20Cr alloy is fully hydrogenated with hydrogen under a pressure of about 79 atm. The sample is then sealed and thermally isolated. Then the sample is allowed to rapidly dehydrogenate. Thermal isolation ensures that the only heat available for the endothermic dehydrogenation reaction is from the heat capacity of the sample itself and the sample vessel. Thus, the sample cools as dehydrogenation proceeds with the reduction in temperature limited only by the dehydrogenation kinetics or the hydrogen capacity.

Figure 3:
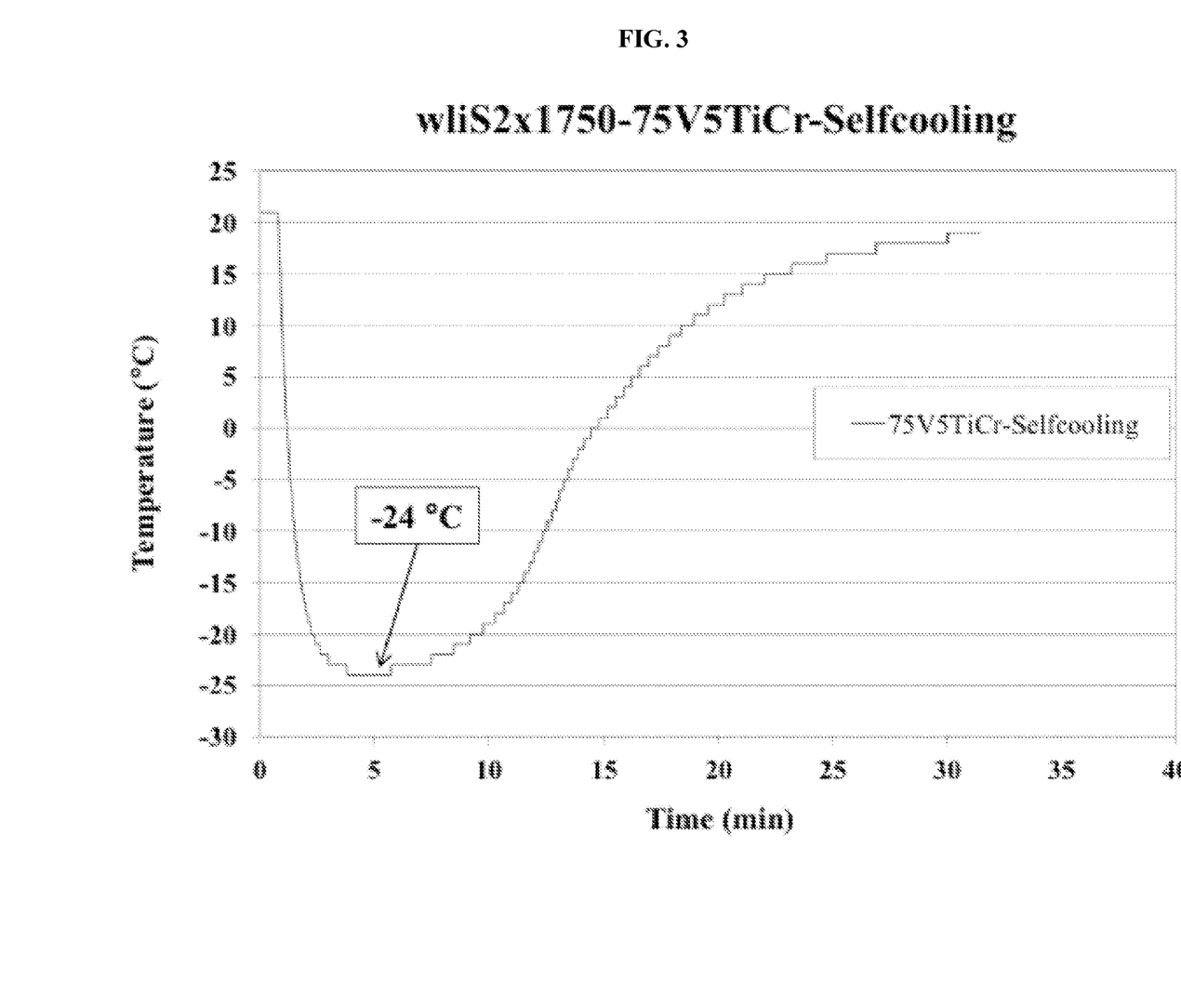
FIG. 3 is a graph of temperature against time to demonstrate self-cooling of V$_{0.75}$Ti$_{0.05}$Cr$_{0.2}$ alloys during rapid dehydrogenation, in some embodiments (see Example).

The results are shown in FIG. 3. In FIG. 3, temperature is plotted against time to demonstrate self-cooling of 75V-5Ti-20Cr alloys during rapid dehydrogenation. The sample temperature self-cools to about −24° C. in approximately 5 minutes. In addition, the temperature remains below 0° C. for nearly 15 minutes during which time nearly full dehydrogenation occurs. These results demonstrate that V—Ti—Cr alloys can meet the kinetics requirements, i.e. kinetically characterized in that at a temperature of 0° C. (or less) and in 1 hour, at least 90% of the metal hydride (V—Ti—Cr—H) is converted to the metallic state (V—Ti—Cr) and hydrogen ($H_2$).

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A thermal energy storage system comprising:
   a first container or region and a second container or region, wherein said first container or region is spatially separated from said second container or region;
   in said first container or region, a metal-containing first material having a first-material metallic state and a first-material metal hydride state, wherein said first material has a first-material thermal energy storage density of about 1300 kJ/kg to about 2200 kJ/kg based on hydrogenation of said first-material metallic state to said first-material metal hydride state;
   in said second container or region, a metal-containing second material having a second-material metallic state and a second-material metal hydride state, wherein said second material has a second-material thermal energy storage density of about 200 kJ/kg to about 1000 kJ/kg based on hydrogenation of said second-material metallic state to said second-material metal hydride state, and wherein said second material is different than said first material; and
   a hydrogen conduit connecting said first container or region with said second container or region, wherein said hydrogen conduit is configured for reversibly transporting hydrogen between said first container or region and said second container or region,
   wherein said first material is kinetically characterized in that at a temperature of 20° C. and in 1 hour, in the presence of said hydrogen, at least 90% of said first-material metallic state is converted to said first-material metal hydride state, and
   wherein said second material is kinetically characterized in that at a temperature of 0° C. and in 1 hour, at least 90% of said second-material metal hydride state is converted to said second-material metallic state and said hydrogen.

2. The thermal energy storage system of claim 1, wherein said first-material thermal energy storage density is about 1600 kJ/kg to about 2200 kJ/kg.

3. The thermal energy storage system of claim 1, wherein said second-material thermal energy storage density is about 200 kJ/kg to about 450 kJ/kg.

4. The thermal energy storage system of claim 1, wherein said first material is kinetically characterized in that at a temperature of 20° C. and in 1 hour, in the presence of said hydrogen, at least 95% of said first-material metallic state is converted to said first-material metal hydride state.

5. The thermal energy storage system of claim 4, wherein said first material is kinetically characterized in that at a temperature of 20° C. and in 1 hour, in the presence of said hydrogen, at least 99% of said first-material metallic state is converted to said first-material metal hydride state.

6. The thermal energy storage system of claim 1, said second material is kinetically characterized in that at a temperature of 0° C. and in 1 hour, at least 95% of said second-material metal hydride state is converted to said second-material metallic state and said hydrogen.

7. The thermal energy storage system of claim 6, said second material is kinetically characterized in that at a temperature of 0° C. and in 1 hour, at least 99% of said second-material metal hydride state is converted to said second-material metallic state and said hydrogen.

8. The thermal energy storage system of claim 1, wherein said first material comprises $MgH_2$ and a catalyst with catalytic activity for hydrogenating said first-material metallic state to said first-material metal hydride state.

9. The thermal energy storage system of claim 8, wherein said catalyst contains Ti.

10. The thermal energy storage system of claim 9, wherein said catalyst is selected from the group consisting of Ti, $TiH_2$, TiAl, $Ti_3Al$, TiNi, TiFe, TiNb, $TiMn_2$, TiVMn, and combinations thereof.

11. The thermal energy storage system of claim 10, wherein said catalyst is selected from the group consisting of $TiH_2$, TiAl, $TiMn_2$, and combinations thereof.

12. The thermal energy storage system of claim 8, wherein said catalyst is from about 1% to about 20%, on an atom basis, of said first material.

13. The thermal energy storage system of claim 12, wherein said catalyst is from about 5% to about 10%, on an atom basis, of said first material.

14. The thermal energy storage system of claim 1, wherein said second material comprises an intermetallic compound or intermetallic solid solution.

15. The thermal energy storage system of claim 14, wherein said second material comprises $V_xTi_yCr_z$, wherein $x+y+z=1$, $0.5<x<1.0$, $0<y<0.5$, and $0<z<0.5$.

16. The thermal energy storage system of claim 15, wherein said second material, in said second-material metal hydride state, comprises $V_xTi_yCr_zH_h$ wherein h is from about 0.1 to about 2.0.

17. A thermal energy storage system comprising:
  a first container or region and a second container or region, wherein said first container or region is spatially separated from said second container or region;
  in said first container or region, a metal-containing first material having a first-material metallic state and a first-material metal hydride state, wherein said first material has a first-material thermal energy storage density of about 1300 kJ/kg to about 2200 kJ/kg based on hydrogenation of said first-material metallic state to said first-material metal hydride state, wherein said first material comprises $MgH_2$ and a catalyst with catalytic activity for hydrogenating said first-material metallic state to said first-material metal hydride state;
  in said second container or region, a metal-containing second material having a second-material metallic state and a second-material metal hydride state, wherein said second material has a second-material thermal energy storage density of about 200 kJ/kg to about 1000 kJ/kg based on hydrogenation of said second-material metallic state to said second-material metal hydride state, and wherein said second material is different than said first material;
  a hydrogen conduit connecting said first container or region with said second container or region, wherein said hydrogen conduit is configured for reversibly transporting hydrogen between said first container or region and said second container or region; and
  a first heat-transfer medium in communication with a first heat-transfer surface of said first container or region, and a second heat-transfer medium in communication with a second heat-transfer surface of said second container or region,
  wherein said first material is kinetically characterized in that at a temperature of 20° C. and in 1 hour, in the presence of said hydrogen, at least 90% Mg is converted to $MgH_2$, and
  wherein said second material is kinetically characterized in that at a temperature of 0° C. and in 1 hour, at least 90% of said second-material metal hydride state is converted to said second-material metallic state and said hydrogen.

18. The thermal energy storage system of claim 17, wherein said first-material thermal energy storage density is about 1600 kJ/kg to about 2200 kJ/kg.

19. The thermal energy storage system of claim 17, wherein said second-material thermal energy storage density is about 200 kJ/kg to about 450 kJ/kg.

20. The thermal energy storage system of claim 17, wherein said first material is kinetically characterized in that at a temperature of 20° C. and in 1 hour, in the presence of said hydrogen, at least 95% of said Mg is converted to $MgH_2$.

21. The thermal energy storage system of claim 17, said second material is kinetically characterized in that at a temperature of 0° C. and in 1 hour, at least 95% of said second-material metal hydride state is converted to said second-material metallic state and said hydrogen.

22. The thermal energy storage system of claim 17, wherein said second material comprises an intermetallic compound or intermetallic solid solution.

23. The thermal energy storage system of claim 22, wherein said second material comprises $V_xTi_yCr_z$, wherein $x+y+z=1$, $0.5<x<1.0$, $0<y<0.5$, and $0<z<0.5$.

24. The thermal energy storage system of claim 23, wherein said second material, in said second-material metal hydride state, comprises $V_xTi_yCr_zH_h$ wherein h is from about 0.1 to about 2.0.

* * * * *